(12) United States Patent
Roberts et al.

(10) Patent No.: US 10,911,912 B2
(45) Date of Patent: *Feb. 2, 2021

(54) SYSTEM AND METHOD FOR ASSET-AGNOSTIC WIRELESS MONITORING AND PREDICTIVE MAINTENANCE OF DEPLOYED ASSETS

(71) Applicant: The George Washington University, Washington, DC (US)

(72) Inventors: Connor Roberts, White Plains, MD (US); Ekundayo Shittu, Fairfax, VA (US)

(73) Assignee: The George Washington University, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,881

(22) Filed: Oct. 7, 2019

(65) Prior Publication Data
US 2020/0045515 A1 Feb. 6, 2020

Related U.S. Application Data

(63) Continuation of application No. 15/880,360, filed on Jan. 25, 2018, now Pat. No. 10,440,535.
(Continued)

(51) Int. Cl.
*G08B 21/00* (2006.01)
*H04W 4/38* (2018.01)
(Continued)

(52) U.S. Cl.
CPC .............. *H04W 4/38* (2018.02); *G06F 17/18* (2013.01); *G08B 21/18* (2013.01); *H04W 4/33* (2018.02); *H04W 4/70* (2018.02); *H04W 84/18* (2013.01)

(58) Field of Classification Search
CPC ......... H04W 4/38; H04W 4/33; H04W 4/029; H04W 64/00; G08B 21/18; G06F 17/18
See application file for complete search history.

(56) References Cited

U.S. PATENT DOCUMENTS 7,774,211 B1 8/2010 Mullen
9,740,545 B2 * 8/2017 Aisu .................... G06F 11/008
(Continued)

FOREIGN PATENT DOCUMENTS

WO WO-2015/121454 A1 8/2015

OTHER PUBLICATIONS

Jia, et al., The C-Terminal Sequence of IFITM1 Regulates Its Anti-HIV-1 Activity, PLoS One, Mar. 4, 2015, vol. 10, No. 3, pp. 1-17.
(Continued)

*Primary Examiner* — Toan N Pham
(74) *Attorney, Agent, or Firm* — Blank Rome LLP

(57) ABSTRACT

Systems and methods for asset monitoring utilize a network, one or more data servers, one or more asset-monitoring modules, and one or more beacon modules to monitor assets deployed across a facility. The systems and methods are asset-agnostic and are able to provide statistical forecasts and degradation model for each asset monitored. The systems and methods may further apply real-time regression, including Bayesian updating techniques to provide real-time corrections to forecasts and degradation models.

27 Claims, 10 Drawing Sheets

Related U.S. Application Data

(60) Provisional application No. 62/450,365, filed on Jan. 25, 2017.

(51) Int. Cl.
    *G08B 21/18*     (2006.01)
    *H04W 4/33*     (2018.01)
    *G06F 17/18*     (2006.01)
    *H04W 4/70*     (2018.01)
    *H04W 84/18*     (2009.01)

(56) References Cited

U.S. PATENT DOCUMENTS

| | | |
|---|---|---|
| 9,859,594 B2 | 1/2018 | Miller |
| 2007/0041981 A1 | 2/2007 | Howard et al. |
| 2009/0204232 A1 | 8/2009 | Guru |
| 2009/0237253 A1 | 9/2009 | Neuwirth |
| 2011/0275542 A1 | 11/2011 | Eden et al. |
| 2014/0242075 A1 | 8/2014 | Parren et al. |
| 2015/0024482 A1 | 1/2015 | Frigault et al. |
| 2015/0374790 A1 | 12/2015 | Liu et al. |
| 2016/0030659 A1 | 2/2016 | Cheney |
| 2016/0259061 A1 | 9/2016 | Carter |

OTHER PUBLICATIONS

Yu et al., "IFITM Proteins Restrict HIV-1 Infection by Antagonizing the Envelope Glycoprotein", Cell Reports, Sep. 17, 2015, vol. 13, No. 1, pp. 145-156.

Johnston et al., "The immunoreceptor TIGIT regulates antitumor and Antiviral CD8(+) T Cell Effector Function", Cancer Cell, Dec. 8, 2014, vol. 26, No. 6, pp. 923-937.

International Search Report & Written Opinion for PCT/US2017/026669, dated Jun. 27, 2017, 16 pages.

\* cited by examiner

SYSTEM AND METHOD FOR ASSET-AGNOSTIC WIRELESS MONITORING AND PREDICTIVE MAINTENANCE OF DEPLOYED ASSETS

RELATED APPLICATIONS

This application is a continuation of U.S. patent application Ser. No. 15/880,360, filed Jan. 25, 2018, now U.S. Pat. No. 10,440,535, which claims the benefit of U.S. Provisional Application No. 62/450,365, filed Jan. 25, 2017. The entire contents of these applications are incorporated herein by reference.

BACKGROUND OF THE INVENTION

Field of the Invention

The present invention relates to monitoring and maintaining assets at a facility. More particularly, the present invention employs wireless networking to design an asset-agnostic monitoring system that provides alerts and recommendations on deployed assets.

Background of the Related Art

In recent years, the shortcomings of medical equipment management have come under increased scrutiny. At least 50,000 serious adverse events are caused by medical devices annually in the Unites States, with over 3,000 of such events being patient deaths. These statistics are collected through voluntary reporting; hence the actual amount of harm caused by medical device failure may be much greater than indicated. In response to this, the U.S. Food and Drug Administration has called for improvement in medical device surveillance across the country.

Healthcare providers also face significant challenges in developing smart, effective maintenance strategies. Those in charge of managing hospital equipment, called clinical engineers, traditionally perform preventative maintenance on medical equipment at scheduled intervals following original equipment manufacturer (OEM) recommendations. This is inherently inefficient, as degradation results not directly from the passage of time, but from equipment use and suboptimal environmental conditions. Moreover, the desire to curtail liability and strengthen parts sales gives manufacturers the incentive to recommend overly-frequent preventative maintenance tasks. The rapid proliferation of equipment in hospitals has amplified these inefficiencies, making maintenance compliance prohibitively expensive (and oftentimes unattainable), and finally compelled the key oversight groups, the Centers for Medicare and Medicaid Services (CMS) and The Joint Commission (TJC), to allow hospitals to enact maintenance policies that deviate from OEM recommendations so long as patient safety is preserved. The freedom to utilize these customized policies, termed alternative equipment maintenance (AEM) programs, has thrown the industry into a state of transformation, sending clinical engineers everywhere on a hunt for data that will support the formation of reliable, sustainable AEM programs.

SUMMARY OF THE INVENTION

The solution to these many challenges may rest in Internet of Things (IoT) technology, whereby physical objects are equipped with wireless-communication-enabled electronics and brought into a network. As wireless networking devices have become smaller and more power-efficient, it has suddenly become possible to collect vast amounts of data on key metrics of interest. Such devices may be outfitted with sensors and deployed in a variety of settings; helping to track shipping containers as they move across oceans, monitoring critical infrastructure for failure-inducing conditions, and enabling energy-efficient "smart" homes. If properly leveraged, IoT may prove to be a wellspring of data needed for the formation of effective AEM programs, a tracking aid that allows nurses to reclaim precious hours lost searching, and an unrelenting, comprehensive observer capable of preventing dangerous equipment malfunctions before they materialize. Going further, any asset might be brought under the fold of such a system, so that the benefits of IoT spread past diagnostic and imaging equipment, and extend to beds, tool carts, refrigerators, computers, etc. IoT truly has the potential to revolutionize asset management within healthcare facilities and beyond.

Accordingly, it is an object of the invention to monitor assets deployed through a facility using networked sensors and provide alerts, maintenance recommendations, and reports using the collected data.

The system is comprised of two main subsystems: the asset-monitoring network and the data analysis algorithm. The former is a wireless network of sensor-equipped modules affixed to equipment distributed within a facility. These modules collect data relevant to the operation and environment of equipment and transmit this data to a central server within the facility. Data processing may occur directly on this server, or it may occur remotely (i.e., through "cloud computing") with the server acting as a conduit between the asset-monitoring network and a web-based application. The other major subsystem, the data analysis algorithm, combines data collected by the asset-monitoring network with user-provided information to form a statistical degradation model specific to each asset being monitored. Thousands of simulations are performed using these models in order to make predictions as to when each piece of equipment will require maintenance and what type of maintenance is likely to be required. Alerts are also raised if any observed condition is deemed to necessitate immediate corrective action. Finally, the algorithm identifies patterns in the data collected, using this information to improve its models and communicating them to the user so they may adapt their equipment management strategies accordingly. All alerts, maintenance recommendations, and reports are communicated to the user through a dashboard accessed via computer or mobile device.

The system is designed to meet the needs of the healthcare equipment management field (also called "clinical engineering"). Traditionally, clinical engineers perform preventative maintenance on medical equipment at scheduled intervals following original equipment manufacturer (OEM) recommendations. This is inherently inefficient, as degradation results not directly from the passage of time, but from equipment use and suboptimal environmental conditions. Moreover, the desire to curtail liability and strengthen parts sales gives manufacturers the incentive to recommend overly-frequent preventative maintenance tasks. The rapid proliferation of equipment in hospitals has amplified these inefficiencies, making maintenance compliance prohibitively expensive and compelling the key oversight groups, the Centers for Medicare and Medicaid Services (CMS) and The Joint Commission (TJC), to allow hospitals to enact maintenance policies that deviate from OEM recommendations as long as patient safety is preserved. The freedom to utilize these customized policies, termed alternative equipment maintenance (AEM) programs, has thrust the industry into a state of transformation, sending clinical engineers everywhere on a hunt for data that will support the formation of reliable, sustainable AEM programs. This system satisfies that demand by gathering and analyzing the data most relevant to the making of well-informed maintenance decisions. The rich insights into equipment health gleaned by the system will enable clinical engineers to abandon inefficient OEM-recommended maintenance intervals in favor of dynamic, condition-based policies. This approach will eliminate unproductive preventative maintenance tasks, generating hundreds of thousands of dollars in savings for hospitals, while informing better inventory decisions and bolstering patient safety.

While it was designed with healthcare facilities in mind, the system can be used in any equipment-intensive industry. Forensics laboratories, engineering shops, and factories will all benefit from the optimization of asset management and maintenance that is enabled by this system. In fact, factories and processing plants across the globe have been utilizing condition-based maintenance policies for years through the adoption of self-monitoring equipment. This is a technique pioneered by the U.S. military which also has condition-monitoring technology installed in its planes, ships, and equipment. In each of these cases, though, the monitoring system is specific to a single type of equipment and contained within each machine. The technology described in this document improves on this with a one-system-fits-all approach. The same plug and tag modules may be deployed on any class or type of equipment in any setting. They are interoperable and all data is handled by the same adaptive algorithm. This means that, for example, data collected while monitoring a drill press in a fabrication shop may later be used to bolster the degradation forecast of a 3D printer installed in that shop years later. Unlike current technology, the system extends beyond each individual piece of equipment, forming a picture of the equipment environment within the facility as a whole. This leads to much more powerful, accurate insights which, again, may be used in any equipment-intensive setting.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
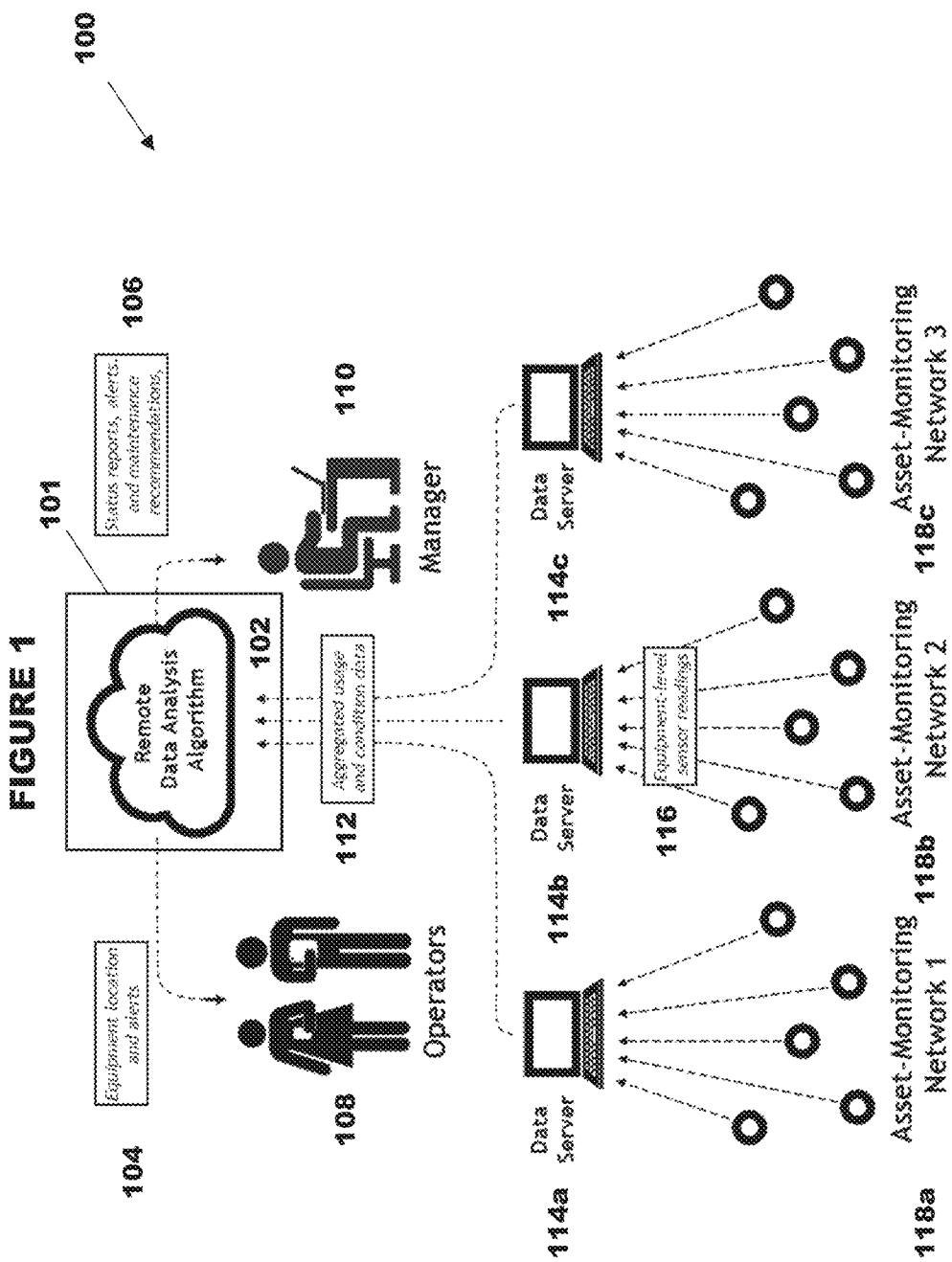
FIG. 1 shows an exemplary system in accordance with the preferred embodiment of the invention, outlining the data flow between subsystems and users.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

The asset-monitoring network is the data collection arm of the system. The foundation of the network consists of two modules (the plug module and tag module) designed to be affixed or connected to equipment. Once deployed, these asset-monitoring modules form a wireless network and begin transmitting collected data. In certain embodiments, the network is a mesh network. In contrast to other configurations such as star and tree networks, a mesh network establishes data routing in a dynamic, ad hoc manner, making this topology more efficient and resilient than alternatives.

FIG. 1 is an exemplary system 100 in accordance with the preferred embodiment of the invention, outlining the data flow between subsystems and users. The Remote Data Analysis Algorithm 102 is responsible for controlling the logic of the system. The Remote Data Analysis Algorithm 102 may operate on processing device 101, such as a computer or server. The processing device 101 can be centrally located and communicate with one or more data servers 114, such as through the internet or a global or local network. For example, the central processing device 101 can be a server or the like that is located at a building, and the data servers 114 can be on different floors of the building. Still further, the data servers 114 can each be provided in different buildings, and the central processing device 101 can be remotely located and communicate with each of the data servers 114. In yet another embodiment, the data processor 101 can be co-located and/or integral with one or more of the data servers 114.

The Remote Data Analysis Algorithm 102 acts to collect and output data including equipment location and alerts 104 as well as status reports, alerts, and maintenance recommendations 106. Alerts can be raised, for example, when asset conditions are detected that violate user-defined rules or are known to cause harm to assets. Examples of conditions that might actuate an alert include: temperature or humidity outside of a manufacturer-specified operating range, asset relocation to a restricted area, physical abuse of asset, asset exposure to a power surge, and asset overuse. Other output data such as status reports and maintenance recommendations may be issued dynamically as observed conditions change and generate new information, periodically (e.g., daily, weekly), or on demand. Still further, alerts can be generated due to a change in a sensed condition such as current, altitude, movement.

These data outputs are selectively provided to either operators 108 and/or managers 110, each of who receive that data on a networked device, such as a computer, tablet, or smartphone. Determination of data provisioning and calculation of that data is performed by the Remote Data Analysis Algorithm 102 based its analysis of aggregated usage and condition data 112. This data is aggregated from one or more data servers 114a, 114b, 114c that are networked to the computer running the Remote Data Analysis Algorithm 102. The data servers 114a, 114b, 114c are responsible for collecting equipment-level sensor reading 116 from asset-monitoring networks 118a, 118b, 118c and forwarding that data upstream to the Remote Data Analysis Algorithm 102.

Figure 2:
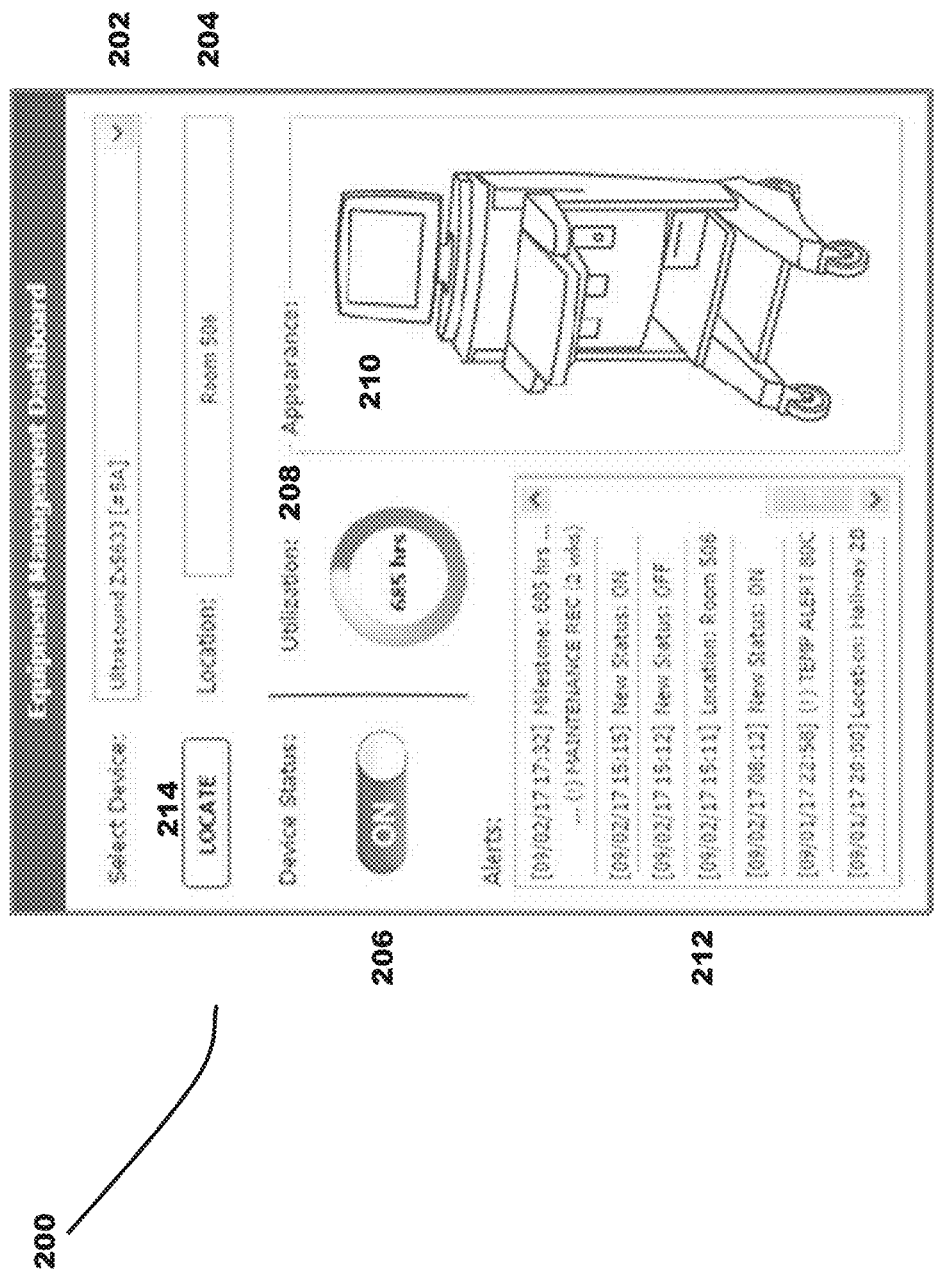
FIG. 2 shows an exemplary embodiment of the invention in which the dashboard and/or user interface shows system alerts and recommendations.

FIG. 2 shows an exemplary embodiment of the invention in which the dashboard and/or user interface 200 displays system alerts and recommendations to operators 108 and/or managers 110. The user interface 200 can be provided at the processing device 101, and/or at one or more of the data servers 114, or through a networked device such as a computer, tablet, or smartphone. The user interface 200 may take the form of an "Equipment Management Dashboard," as shown in FIG. 2. The user interface 200 displays real-time data related to equipment (assets) that the system 100 is designed to oversee. In this exemplary embodiment, the user interface 200 allows the operators 108 and/or managers 110 to select a device/asset to display 202, the location of that device/asset 204, the status of the device/asset 206, utilization of that device/asset 208, the appearance of the device/asset 210, and alerts 212 associated with that device/asset. Using the user interface 200, operators 108 and/or managers 110 are able to actively monitor and track devices/assets that are networked to the system. Operators 108 and/or managers 110 are also able to use the user interface 200 to find assets 300 that are being tracked by selecting the "LOCATE" button 214.

Figure 3:
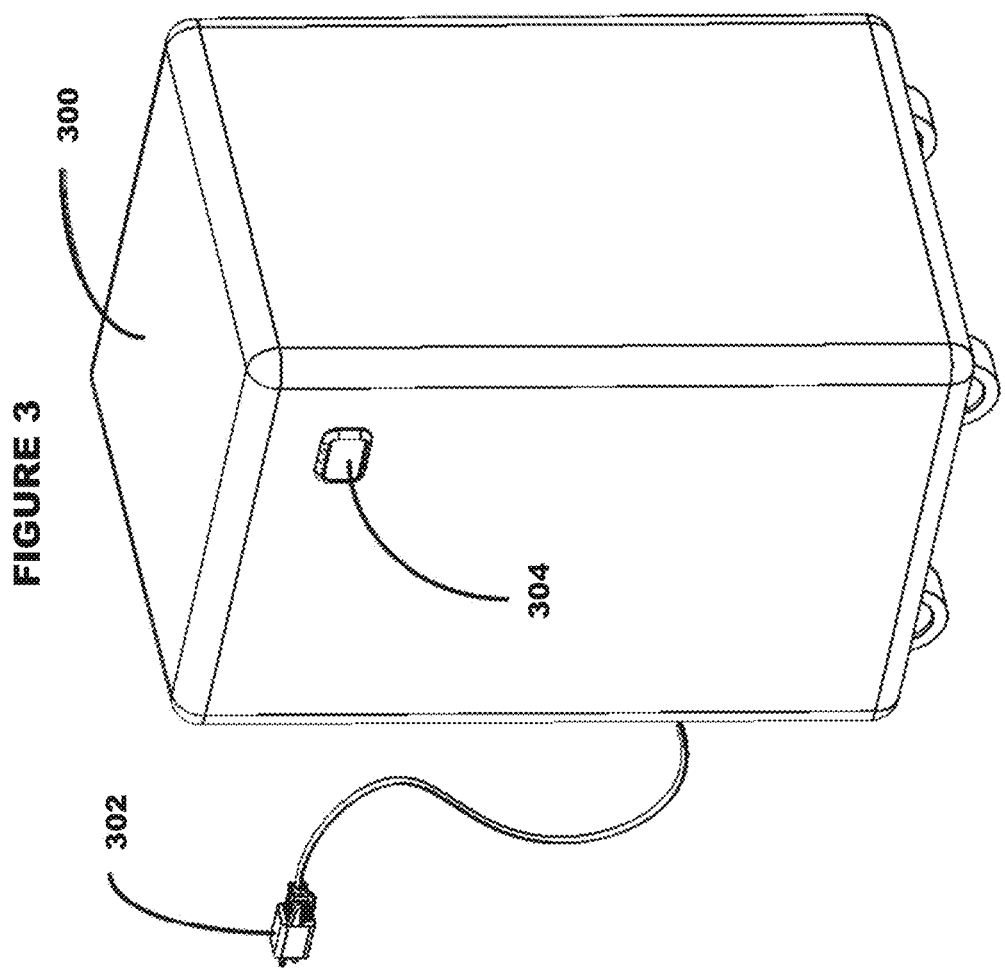
FIG. 3 shows an exemplary embodiment of the invention where a plug and an asset-monitoring module(s) is deployed on a generic asset.

FIG. 3 shows an exemplary embodiment of the invention where an asset-monitoring module is deployed on a generic device/asset 300. The asset-monitoring module can be, for example, in the form of a plug adapter 302 or a tag module 304. In one embodiment of the invention, the plug module 302 is designed to mate with standard male electrical plugs (A/C as well as D/C) and is networked to the system 100. In this manner, the system can monitor activity and usage of the device/asset 300. The tag module 304 is similarly associated with the device/asset 300, such as by being affixed to the housing of the asset 300 (by an adhesive, fastener or the like), and is also networked to the system 100. As explained further below, the asset-monitoring module 304 provides additional data on the performance of the device/asset 300 for analysis by the system. In one embodiment, each asset-monitoring module 302, 304 is associated with a single asset 300 and each asset 300 has one or more asset-monitoring modules 302 and/or 304. The tag module 304 does not require the asset to have an AC plug in order to operate, as it may still monitor environmental and operational conditions in its absence.

Figure 4:
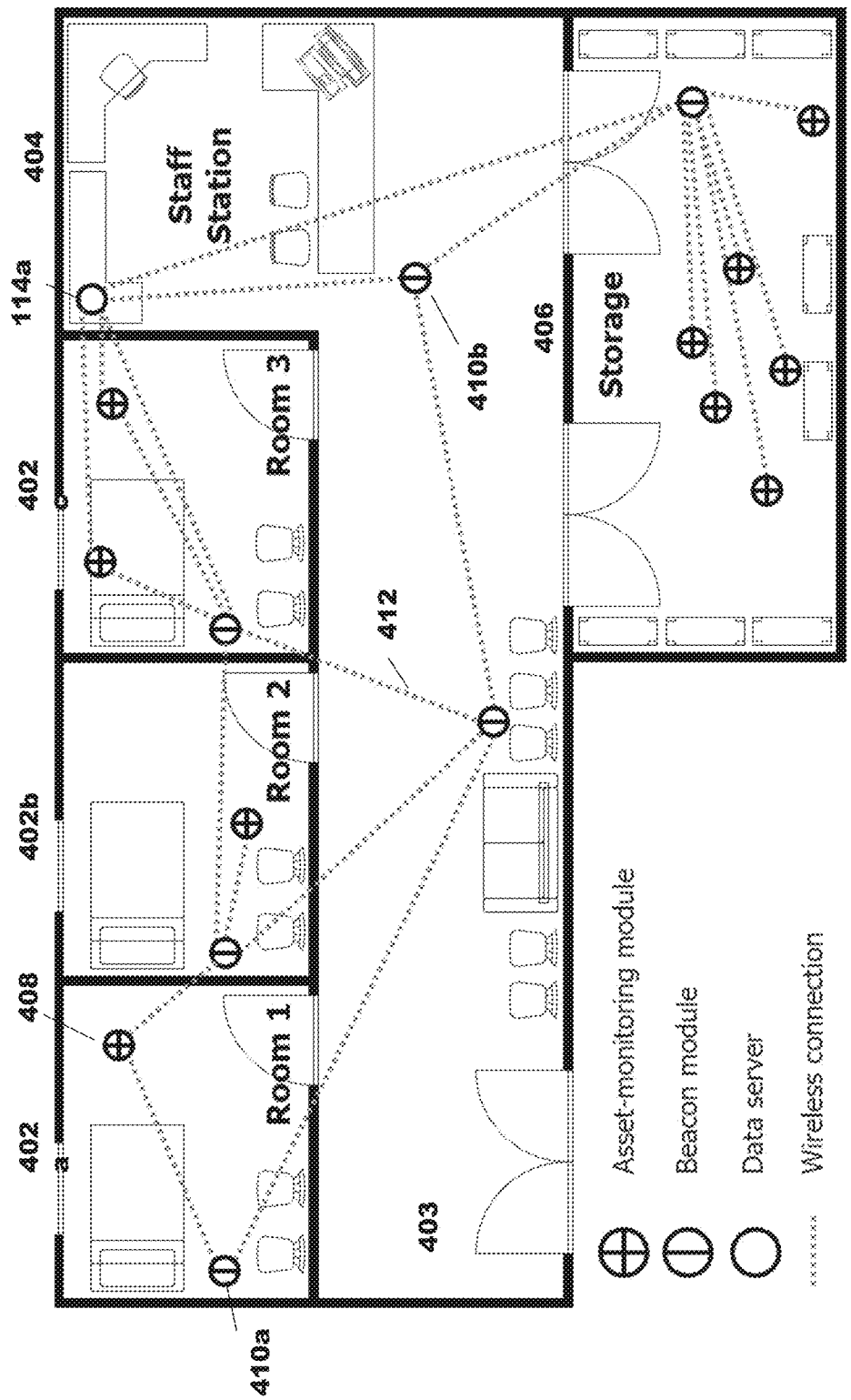
FIG. 4 shows an exemplary embodiment of the invention in which the system is deployed in a facility.

FIG. 4 shows an exemplary embodiment of the invention in which the system 100 is deployed in a facility. For example, a facility may be a healthcare facility such as a hospital, office, domestic residence, care center, medical building or other location. In FIG. 4, this facility has three patient rooms 402a, 402b, 402c, a staff station room or area 404, and a storage room or area 406. In this exemplary implementation of the system, one or more asset-monitoring modules 408 are deployed through the three rooms 402a, 402b, 402c; a staff station 404, and storage 406. Asset-monitoring modules 408 may be, for example, a plug module (such as plug 302) or a tag module (such as tag module 304), and are each associated with a respective asset 300 (not shown in FIG. 4 for ease of illustration).

The asset-monitoring modules 408 are equipped with one or more sensors, enabling the observation of environmental conditions such as temperature, humidity, atmospheric pressure, vibrations and movement, magnetic field strength, radiation, etc. Each type of module 408 also has unique data-collection specialties, with the tag module 304 also monitoring operational conditions (e.g., if equipment is dropped or shaken), and the plug module 304 monitoring equipment usage (e.g. how many hours equipment has been in use, frequent modes of operation). Environmental conditions, operational conditions, and usage information are all major factors in the performance, longevity, and maintenance requirements of equipment. By monitoring them closely, the system is able to estimate the health of the equipment in real-time, raising alerts and making recommendations accordingly.

The asset-monitoring modules 408 are networked together by wireless connection 412. This wireless connection 412 forms a network that is also able to determine the location of equipment within the facility by using specialized beacon modules 410. This is helpful for users to locate a specific asset 300 within a large facility, and is also important for the optimization of equipment management plans. For example, the system 100 may detect that a certain room is too humid, that equipment is stored far away from where it is needed, or that equipment used in a certain area of the facility is treated more harshly than in other areas. As demonstrated by these examples, observations on equipment conditions may be more insightful with the addition of location information.

All modules 408, 410 in the network are capable of dual-band communication, transmitting and receiving information using both high-frequency (e.g., 2.4 GHz) and low-frequency (e.g., 915 MHz) bands. The high-frequency signals are sharply attenuated by obstacles such as walls and ceilings, making them ideal for location tracking (as explained later, with respect to the beacon modules 410) while the low-frequency signals are not attenuated as much by obstacles, making them suitable for data transfer by modules 408, 410 across large facilities. As shown, one or more local beacons 410a can be placed to be in wireless communication with one or more asset-monitoring modules 408. Communication of the system is mediated by the data server 114a.

For instance, the beacon(s) 410a can be located in a same room 402, 406 as the asset-monitoring modules 408. In addition, one or more centralized beacons 410b can be placed to be in wireless communication with the local or other central beacons 410a, 410b. The local beacons 410a receive data signals from the asset-monitoring modules 408 and convey them directly or via one or more central beacons 410b to the data server 114. As further shown, the asset-monitoring modules 408 can communicate with a local beacon 410a positioned in another room, or can communicate directly to a central beacon 410b. The central beacons 410b can be positioned in a more central location (such as a hallway, lobby, or waiting area), to link the asset-monitoring module 408 and/or local beacons 410a to the data server 114a.

Plug Module 302

Figure 5:
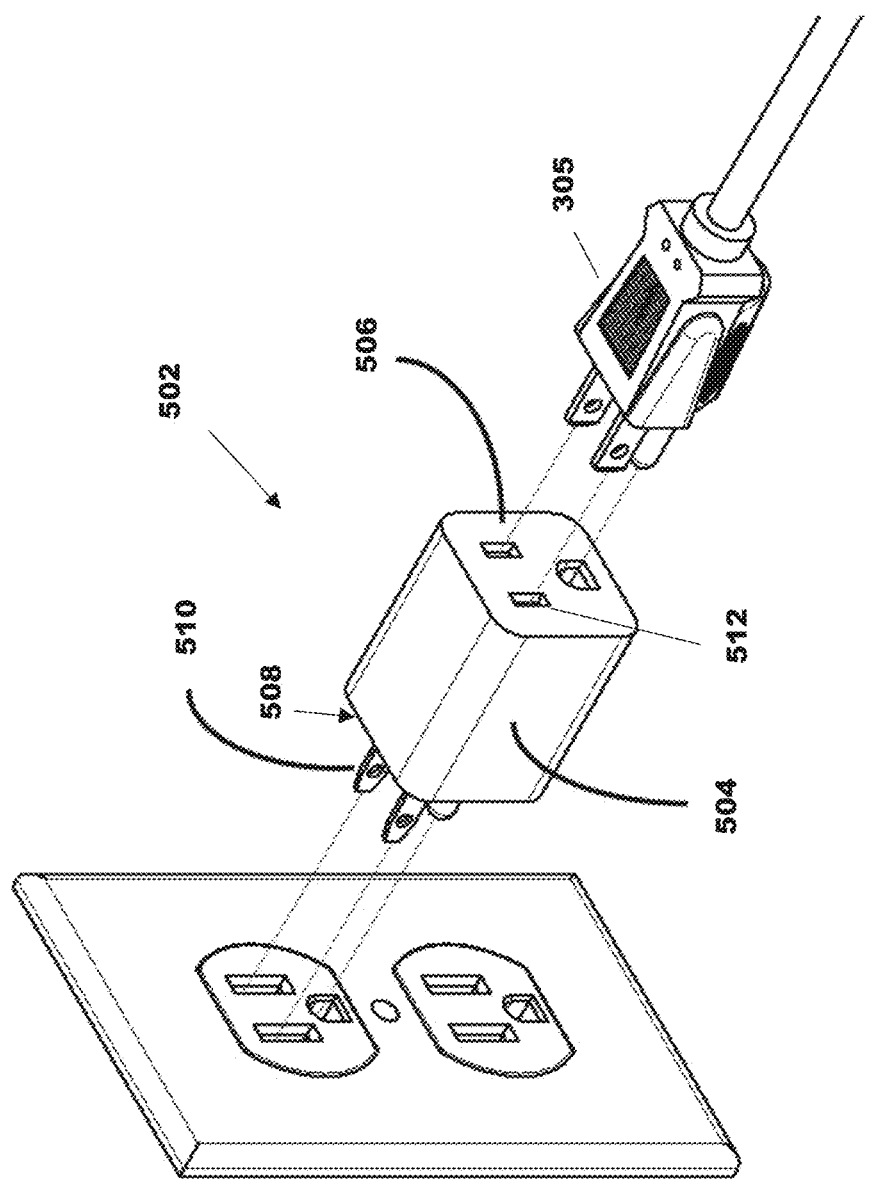
FIG. 5 shows an exemplary embodiment of the invention in which the plug module is connected to the power cord of a generic asset.

Turning to FIG. 5, details of the plug asset-monitoring module 502 are shown, which can be for example the plug module 302 shown in FIG. 3. The plug module 502 has a body or housing 504, male electrical member 510 and female electrical member 512. The body 504 can generally have a cube or be elongated to have a rectangular shape and is approximately the same size as an AC plug 305 of the asset 300, as shown, though any suitable size and shape can be utilized. The body 504 has a proximal end 506 and an opposite distal end 508, and can be for example solid molded plastic casing. The male electrical member 510 can be a standard 2- or 3-pronged plug (with a positive line and a negative and/or ground line) and is positioned at the distal end 508 and the female electrical member 512 can be a standard 2- or 3-socket receptacle (with a positive line and a negative and/or ground line) and is positioned at the proximal end 506.

The plug adaptor or module 502 acts as an intermediary between the AC plug 305 of the electronic asset 300 and a power source, such as an AC outlet. The power cord 305 of the asset 300 has a male plug that is removably engaged and received by the female electrical member 512 at the proximal end 506 of the plug body 504. And the male electrical member 510 is inserted into the female receptacle of the AC wall socket outlet. In so doing, an electrical connection is established from the asset plug 305, from the female electrical member 512 to the male electrical member 510, to the AC wall outlet, so that the asset 300 draws the needed AC power from the wall outlet as if the asset 300 were plugged directly into the wall outlet.

A current sensor 618 (FIG. 6) is positioned inside the plug body 502, between and electrically connected with the female electrical members 512 and the male electrical members 508. Accordingly, an electrical connection is established from the female socket 512 to the current sensor 618, and from the sensor 618 to the male prongs 510. One of the current-carrying lines (e.g., the positive socket and plug of the members 512, 510 or the negative socket and plug of the members 512, 510) passes through the current sensor 618, though the current sensor 618 can be connected to the male and female members 510, 512 in any suitable manner.

The sensor monitors the amount of electrical current drawn by the machine or asset 300 at any given time, and can therefore discern whether the asset 300 is on or off, as well as the mode in which the machine is being operated (e.g., high/medium/low; heating/cooling). Upon module installation, the user is instructed to turn the asset 300 on, then off, then on again, and to cycle through its different operational modes. The plug module 502 observes and registers the current drawn as the machine transitions between each mode, using this information to interpret future observations. A user enters the mode into the user interface 200 as he goes through each mode. For example, when a user turns off an asset, he may enter "OFF" into the user interface 200 so that the system 100 can associate that current level with the "OFF" mode. In an alternative embodiment, the characteristic current draw of each mode could be provided by the manufacturer and manually or automatically entered into the system 100. All data collected by the plug module 502 is transmitted wirelessly to data servers 114a, 114b, 114c. These data servers 114a, 114b, 114c could be on different floors, different ends of the same floor, or different facilities altogether. Moreover, there could be hundreds of data servers, each serving a separate asset-monitoring network and all feeding data into the same Remote Data Analysis Algorithm 102.

Figure 6:
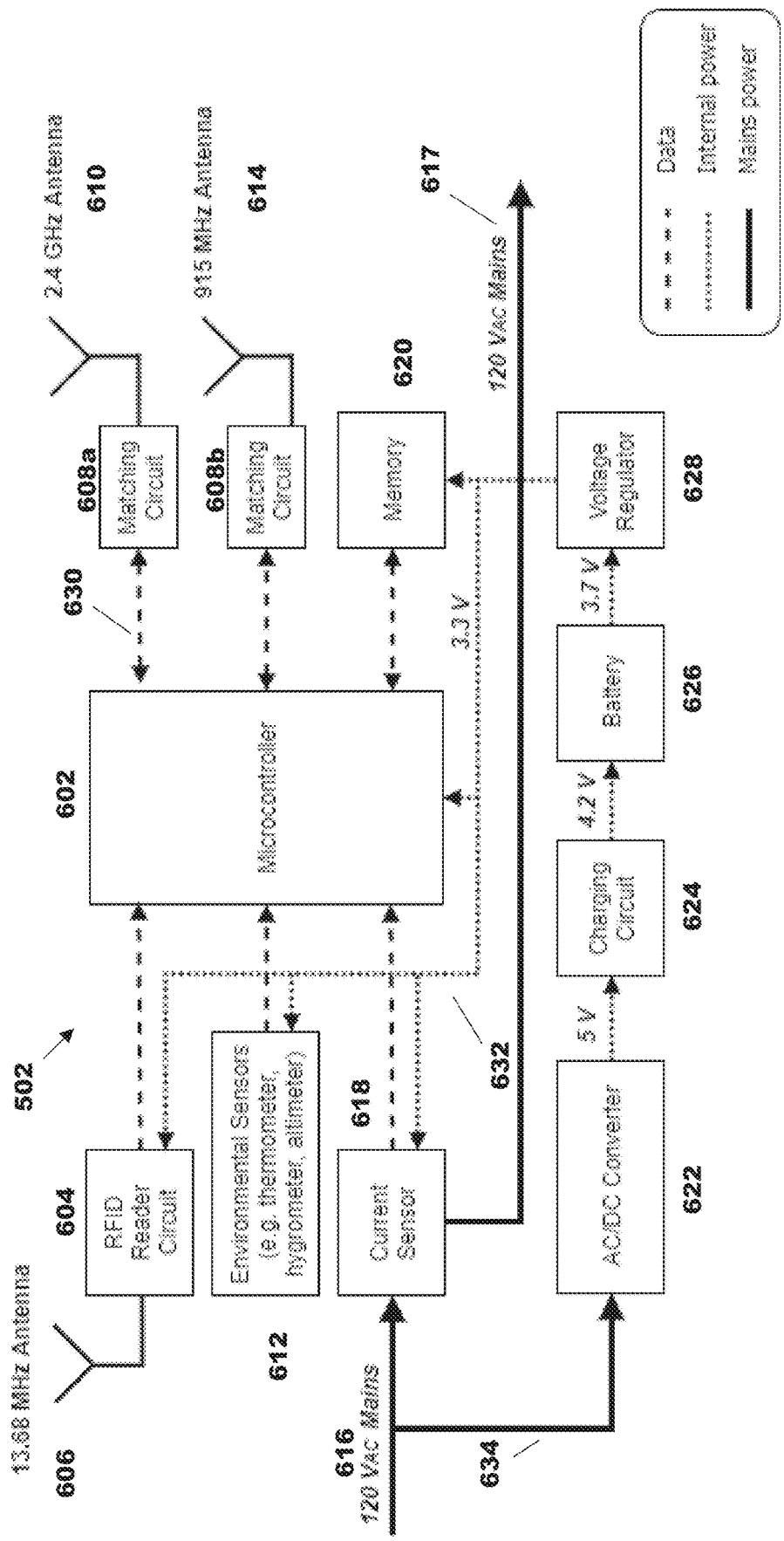
FIG. 6 shows an exemplary embodiment of the invention in which data and power flow in the plug module circuitry is diagrammed.

FIG. 6 shows an exemplary embodiment of the invention in which data and power flow in the plug module 502 circuitry is diagrammed. As shown, data flows within the circuitry are shown as the dashed line 630, internal power is shown by the dotted line 632, and the main power is shown as the solid line 634. The plug module is controlled by a processing device 602 such as a microprocessor. The processing device 602 receives and transmits data using a data connection 630. The microprocessor 602 is connected to memory 620 that may store data related to operation of the module 502, such as asset identification, asset location, and the operational mode information. The memory 620 also stores monitoring data received from the module 502 such as the amount of electrical current drawn by the machine at any given time, whether the asset status (e.g., whether the machine is on or off), as well as the operational mode in which the machine is being operated (e.g., high/medium/low; heating/cooling).

The microprocessor 602 is also connected to an RFID reader circuit 604, and matching circuits 608a, 608b. The RFID reader circuit 604 is responsible for receiving and transmitting data through an antenna 606 (e.g., at 13.68 Mhz) and allows the plug module 502 to receive and transmit data about the asset 300. The matching circuits 608a, 608b implement dual-band communication, transmitting and receiving information using both a high-frequency (e.g., 2.4 GHz) antenna 610 and a low-frequency (e.g., 915 MHz) antenna 614, respectively. Antenna 606 receives such data as the asset ID by interrogating the RFID tag module described in detail below. Antenna 610 communicates with beacon module 410 which is a method by which asset location can be determined. Antenna 614 may also be used for the transmitting and receiving of collected data and instructions between the asset-monitoring modules 502 and 700 and the data server 114a. This data transfer (occurring via antenna 614) may also have a beacon module 410 as an intermediary.

Figure 10:
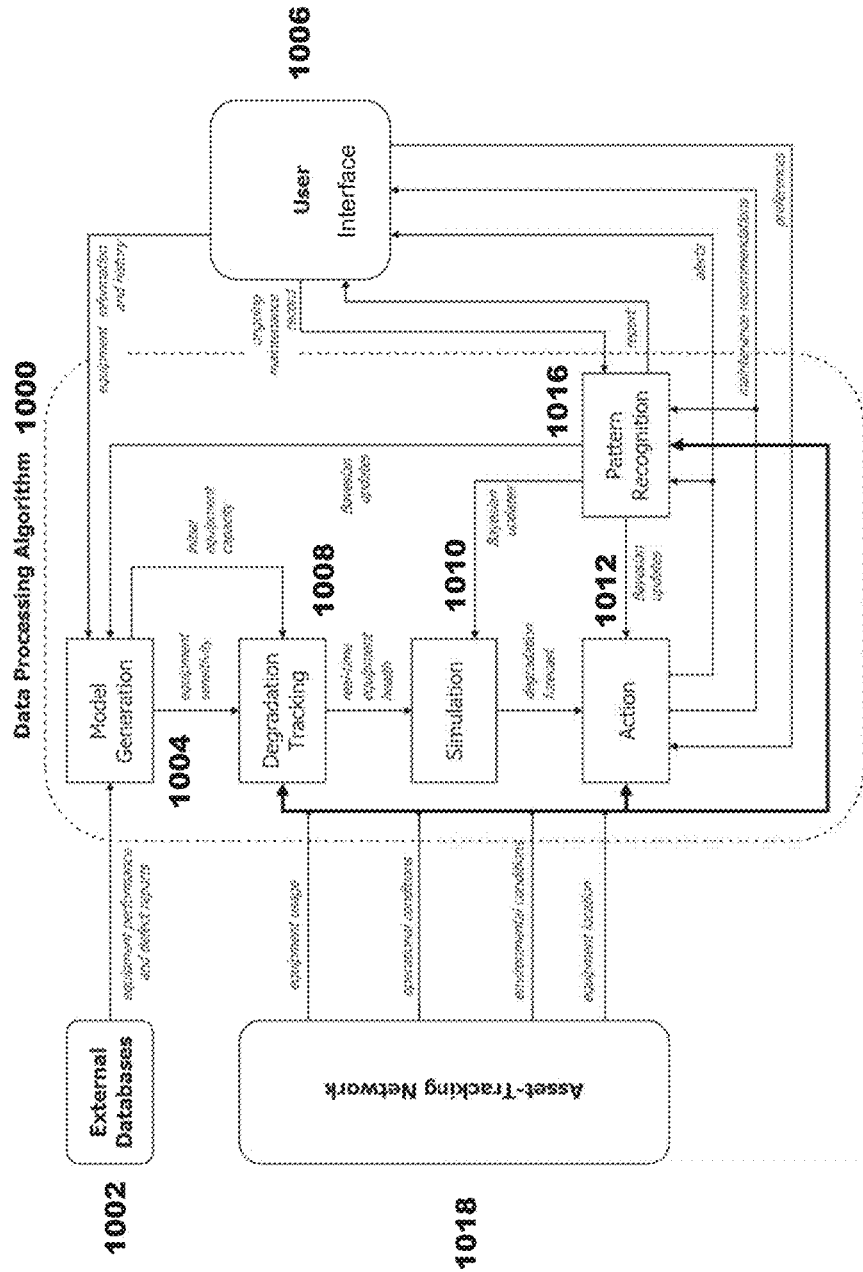
FIG. 10 shows an exemplary embodiment of the invention in which sub-algorithms and their interactions with each other and external subsystems are diagrammed.

The microprocessor 602 receives sensor data related to the asset from one or more environmental sensors 612, such as thermometers, hygrometers, and altimeters. This is among the data transmitted through the antennas. Specifically, this is data transmitted through antenna 614. So sensors 612 take readings (e.g., X degrees Celsius, Y % relative humidity, Z Pa pressure) which are received by microprocessor 602, and this data is then transmitted to data server 114 via 608b, 614. This information is then used by Remote Data Processing Algorithm 102 as shown in FIG. 10. The data collected from the current sensor 618 may also be transmitted through the antenna 614 so that the system is aware of the power consumption and usage statistics of the asset 300.

The power supply 616 to the circuitry is transferred through the AC/DC convertor 622, which preferably transmits 5 V to the charging circuit 624. The charging circuit 624 converts that 5 V to 4.2 V so that it can charge the battery 626. The battery 626 may be lithium-ion or any other rechargeable type known in the art. The battery 626 preferably outputs 3.7 V to the voltage regulator 628. The voltage regulator 628 then outputs 3.3 V to the various components of the circuitry, including the sensors 612, 618, RFID reader circuit 604, microcontroller 602, matching circuits 608, and memory 620. The figure also illustrates that the input power 616 is received from the wall socket via the male prongs 510. In addition, that input power supply 616 proceeds through as the output power supply 617 at the female members 512 to provide a power supply to the asset plug 305.

Tag Module 304

Figure 7:
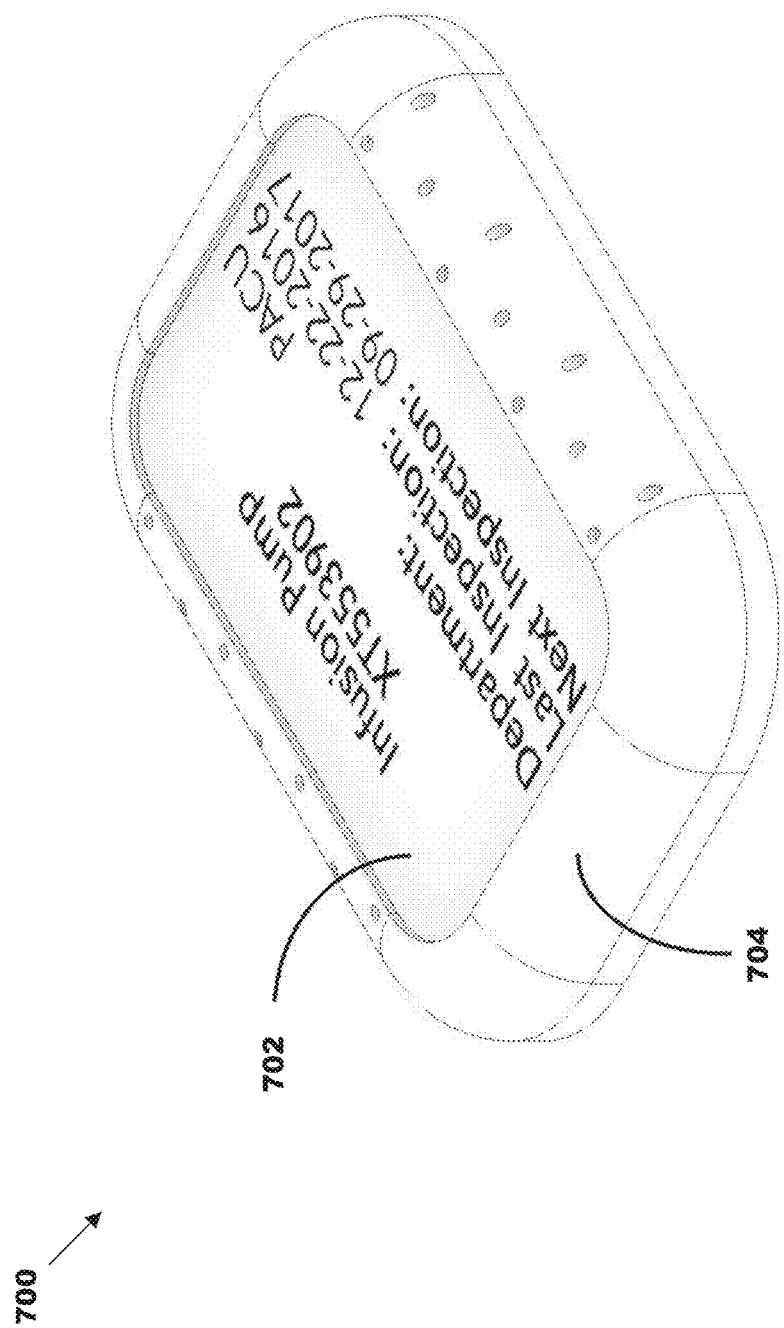
FIG. 7 shows an exemplary embodiment of the invention with a tag module in a hard plastic casing.

Referring to FIG. 7, the second asset-monitoring device is the tag module 700 (such as tag 304), which is a small, lightweight, wireless device that is affixed to equipment via adhesive or suction cup. Once in place, the tag module (similarly to the plug module) uses an array of sensors to observe environmental conditions. Using an internal accelerometer and gyroscope, the tag can detect when equipment is dropped or shaken, as well as the severity of such events. This data is transmitted wirelessly to a central server in the same fashion as the data collected by the plug module.

The tag module 700 may include a user-programmable LCD or e-paper screen 702, allowing it to display information relevant to the asset 300 being monitored such as make/model, date of last inspection, owner, and other such data. These functionalities may be achieved through a software application on a networked device such as a smartphone, tablet, or computer. For example, it could be achieved through dashboard 200. The dashboard 200 may also be used to display status and mode information related to the asset 300. The tag module is preferably enclosed in a hard plastic housing or casing 704.

Figure 8:
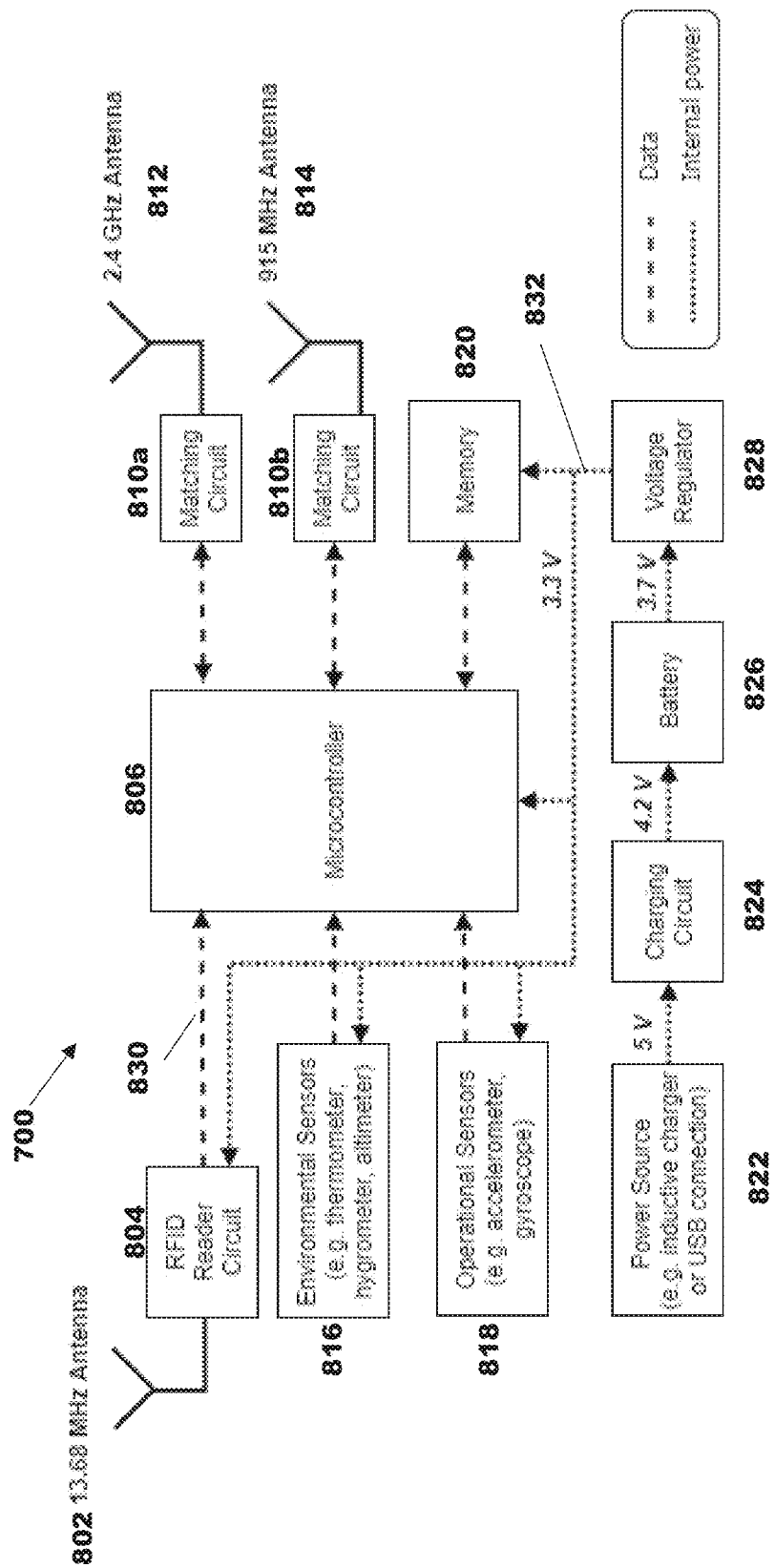
FIG. 8 shows an exemplary embodiment of the invention in which data and power flow in a tag module is diagrammed.

FIG. 8 shows an exemplary embodiment of the invention in which data and power flow in a tag module 700 is diagrammed. As shown, data flows within the circuitry are shown as the dashed line 830 and internal power is shown by the dotted line 832.

As with the plug module (FIG. 6), the tag module is controlled by a processing device 806 such as a microprocessor that receives and transmits data using data connection 830. The microprocessor is connected to memory 820 that stores data related to operation of the module as well as data monitored by the module such as the amount of electrical current drawn by the machine at any given time, whether the machine is on or off, as well as the mode in which the machine is being operated (e.g., high/medium/low; heating/cooling).

The microprocessor 806 is also connected to an RFID reader circuit 804, and matching circuits 810a, 810b. The RFID reader circuit 804 is responsible for receiving and transmitting data through a (e.g., 13.68 Mhz) antenna 802 and allows the tag module to provide data about the asset 300. The matching circuits 810a, 810b are responsible for implementing dual-band communication, transmitting and receiving information using both high-frequency (e.g., 2.4 GHz) antenna 812 and a low-frequency (e.g., 915 MHz) antenna 814, respectively.

The microprocessor 806 receives sensor data related to the asset from one or more environmental sensors 816, such as thermometers, hygrometers, and altimeters. This is among the data transmitted through the antennas. Specifically, this is data transmitted through antenna 814. Environmental sensors 816 take readings, which are received by microprocessor 806, and this data is then transmitted to data server 114 via matching circuit 810b and antenna 814. This information is then used by Remote Data Processing Algorithm 102 as shown in FIG. 10. The microprocessor 806 is also connected to one or more operational sensors 818, such as an accelerometer or gyroscope. The data collected from the operational sensors 818 may also be transmitted through the antenna. Operational sensors 818 take readings, which are received by microprocessor 806, and this data is then transmitted to data server 114 via matching circuit 810b and antenna 814. This information is then used by Remote Data Processing Algorithm 102 as shown in FIG. 10.

The power supply to the circuitry is transferred through the power source 822, preferably using DC power, such as an inductive charger, USB connection, or AC/DC converter. In one embodiment of the invention, the power source 822 transmits 5 V to the charging circuit 824. The charging circuit 824 converts that 5 V to 4.2 V so that it can charge the battery 826. The battery 826 may be lithium-ion or any other rechargeable type known in the art. The battery 826 preferably outputs 3.7 V to the voltage regulator 828. The voltage regulator 828 then outputs 3.3 V to the various components of the circuitry.

Beacon Module 410

Figure 9:
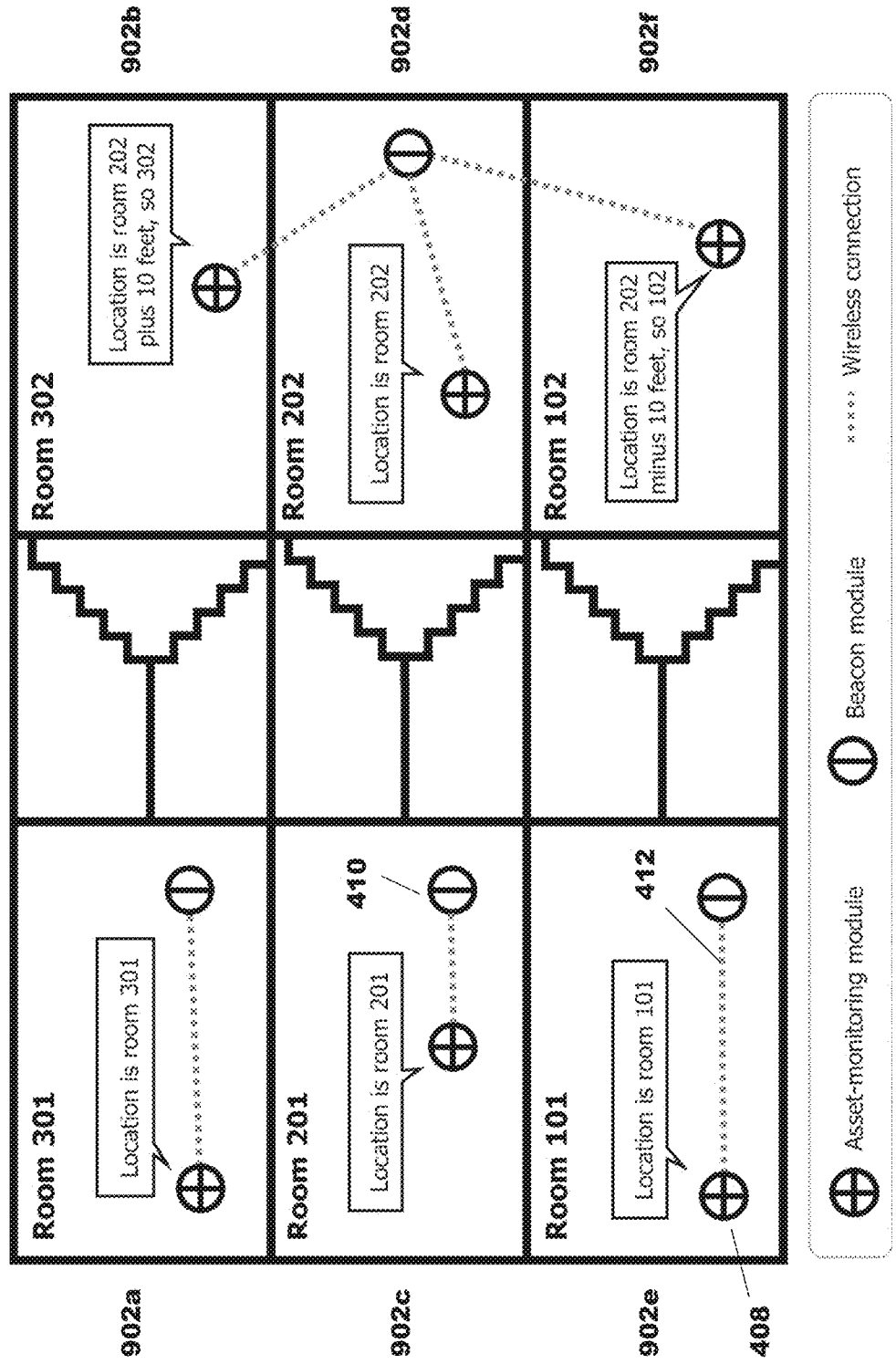
FIG. 9 shows an exemplary embodiment of the invention in which proximity-based location tracking is performed with one beacon per room and where the system uses altimeters to reduce the number of required beacons.

Referring to FIGS. 4 and 9, the beacon module 410 may be battery or mains powered and is deployed throughout a facility, remaining stationary wherever they are placed. The beacon modules 410 broadcast high-frequency locator signals which are sharply attenuated by obstacles such as walls and ceilings. An asset-monitoring module 408 detects these signals and can discern from the observed signal strength which beacon 410 it is closest to. Because the location of a beacon does not change, this is a means by which equipment location within a facility may be determined. A beacon module 410 does have an antenna, housing, and processing device, but it does not have sensors. One example of location tracking works as follows. The asset-monitoring module 408 emits a high-frequency signal indicating that its location needs to be determined. This prompts any beacon module 410 which receives this signal to reply, broadcasting the signal with a unique beacon ID. The asset-monitoring module 408 receives these replies and determines which beacon module 410 it is nearest to, based on which reply has the greatest signal strength. The asset-monitoring module 408 then communicates this information to data server 114, which "knows" which beacon ID is associated with which room or location. This information would have been stored, for example, on the data server 114 during installation of the system. An alternative embodiment is for each beacon module 410 to periodically broadcast its unique beacon ID, rather than being prompted by the asset-monitoring module 408.

Beacon modules also serve as signal repeaters and amplifiers within the network. If an asset-monitoring module transmits data to a beacon module, the beacon module will then echo this transmission (typically transmitting with more power than the originator of the data), effectively increasing the range at which asset-monitoring modules can communicate. This helps to maintain the link between asset-monitoring modules and the central server, even as these modules move across a facility or campus.

The plug and tag asset-monitoring modules 302, 304 have additional common features beyond the environmental condition monitoring described earlier. One such feature is the inclusion of an altimeter, a sensor which observes atmospheric pressure and translates this into some altitude with respect to sea level. This allows the modules to recognize what floor of a facility they are on, thus enabling locator signals from a beacon module to be used not only by modules on that floor, but also the floors immediately above and below. For example, if two modules each detect that the locator beacon in room 401 is nearest, but one module reports an altitude ten feet less than the other, then the system is able to determine that one asset is in room 401 and the other is one floor below in room 301. This same principle may be applied to equipment in room 501 (not shown). Thus, a single locator beacon may be used across three vertically distributed rooms, allowing for a sharp reduction in wireless infrastructure.

There typically will be one beacon module 410 per room and one to two asset-monitoring module 408 per asset.

Several assets, and therefore several asset-monitoring modules 408, can be in a room at once. There is no functional difference between the rooms 402a, 402b, 402c, the staff station 404, and the storage room 406 as far as the system is concerned as these are all just rooms. You may have one asset-monitoring module 408 as in rooms 402a, 402b, 402c, no asset-monitoring module 408 as in staff station 404, or several asset-monitoring modules 408 as in storage room 406. Multiple beacon modules 410 may be located in a room if it is large, such as in 404. This could be the case if one is using beacon modules 410 as signal repeaters as described above and needs to ensure that data can be transmitted down a long hallway or around a corner. It could also be the case if the room is sufficiently large (such as a warehouse or emergency room) such that it is not enough to know that an asset is in the "room" but instead it must be known what bay or wing it is in.

There is one data server 114 per asset-monitoring network, but many such networks may exist within the system. For example, a hospital may wish to set up one small network in the ER and one separate network in the PACU as these are the only units where they care to monitor assets and the units (in this particular hospital) are located far apart. Each network will have its own data server 114a. A different hospital may wish to monitor assets all throughout the facility and so they install a network that spans the whole building. While this network is much larger than either of those implemented in the first hospital, it only requires one data server 114a. Asset-monitoring modules 408 are affixed to assets and therefore are positioned wherever the assets are moved to. Beacon modules 410 are placed where they can service a room and are unlikely to interfere with other beacon modules 410 and confuse the system (so you would not install two beacon modules 410 on either side of a single wall. Beacon modules 410 may also be placed at strategic locations like either end of a long hallway in order to establish a communication link between disparate parts of the facility. The placement of the data server 114a is unimportant as long as it is located where it can reliably communicate with the rest of the asset-monitoring network.

FIG. 9 shows an exemplary embodiment of the invention in which proximity-based location tracking is performed with one beacon module per room and where the system uses altimeters to reduce the number of required beacons. In this exemplary implementation, the system is implemented in a three-story facility with six rooms. The system is optimized to deploy as few modules as possible to spatially locate each asset in the facility. FIG. 9 shows previously identified asset-monitoring modules 408, beacon modules 410, and a wireless connection 412 deployed across the facility. The facility is comprised of a plurality of rooms, with one or more assets in each of the rooms.

Rooms 301, 302, 201, 202, 101, and 102 (902a, 902b, 902c, 902d, 902e, 902f) are shown in FIG. 9. Some of these rooms may have multiple assets situated in them, while others may not have any. Each asset is tagged with an asset-monitoring module 408 that incorporates an altimeter. The altimeter may be used to determine the elevation of the asset, and that elevation may be correlated to a determination of the floor on which the asset is located. As explained above, the altimeter may be measured with respect to the location of a single beacon module 410.

In this manner, as shown in rooms 302, 202, and 102 (902b, 902d, 902f), the single beacon module 410 in room 202 (902d) is used to determine the location of assets located on all three floors, because the single beacon module 410 acts as a reference point for the altimeters of the asset-monitoring modules 408 on each floor. In the exemplary FIG. 9, the system first uses the asset-monitoring module 408 paired with the beacon module 410 in room 202 to determine that the asset is located in room 202. On that basis, because the asset-monitoring module 408 in room 102 (902f) is located ten feet below the beacon module 410, already known to be in room 202 (902d), the system calculates that the asset in question is located in room 102 (902l). On that same basis, the system can determine that the asset-monitoring module 408 located ten feet above the beacon module 410 is located in room 302 (902b).

Another common feature is the ability of the asset-monitoring modules 408 to detect and read small RFID tags, utilizing the RFID readers 604, 804. The user has the option to install a unique RFID tag on each asset 300 to be monitored. The asset-monitoring module 408 reads the RFID tag and instantly knows which specific piece of equipment is being monitored. That is particularly useful when a module 408 is replaced (due to module failure, low battery, etc.), as the replacement module will automatically identify the asset 300 being monitored.

The asset ID is stored in the RFID tag itself. When the module 408 is affixed to the equipment, it is to be placed overtop or adjacent to this RFID tag. Once in place, the RFID readers 604, 804 will interrogate the RFID tag via antennas 606, 802. "Interrogate" in this context means that the reader 604, 804 emits radio waves, causing the RFID tag to respond with the asset ID which it has stored. Once extracted, this information is stored within the microcontroller 602, 806. The system could alternatively be configured either so that whenever module 408 transmits data collected to the data server 114a, it includes the asset ID in the message, thus associating said data with asset 300; or it may be configured so that upon interrogating the RFID tag, the module 408 signals to the data server 114a that it is now associated with the asset 300 and any data later transmitted by module 408 (i.e., carrying the asset-monitoring module ID) is to be associated with the asset 300. This ensures that there is no gap in asset monitoring due to module replacement, and modules may be shifted from asset to asset as needed without creating errors or confusing the system's analysis.

Data Analysis

The system may also apply a data analysis algorithm which works to interpret the data collected by the asset-monitoring network (consisting of plug and tag modules), and leveraging it to inform equipment management strategies. This algorithm consists of five unique sub-algorithms which are described in FIG. 10.

FIG. 10 shows an exemplary embodiment of the invention in which sub-algorithms and their interactions with each other and external subsystems are diagrammed. Together, these sub-algorithms comprise the data processing algorithm 1000 (also shown as Remote Data Analysis Algorithm 102 in FIG. 1). The data processing algorithm 1000 (and its sub-algorithms) receive equipment/asset performance and defect reports from external databases 1002, which are incorporated by the system into its calculations.

The first module of the data processing algorithm 1000 is the model generation sub-algorithm 1004, which is invoked when a new piece of equipment is brought into the asset-monitoring network 1018. This sub-algorithm takes as input from the user via the user interface 1006 (such as via the user interface 200 for the computer 101 or server 114) including general equipment information such as class, make, and model, and uses this to search external databases 1002 (populated by equipment manufacturers, or groups like the Emergency Care Research Institute or the U.S. Food and Drug Administration) for relevant performance data and known deficiencies or defects. The user via the user interface 1006 is also asked to input information specific to the asset 300, such as maintenance history and estimated prior use. Using these factors, a mathematical model of degradation is formed specific to that device. The model is then associated with the specific asset ID. This information is provided by the user through some networked device such as a computer, tablet, or smartphone and is then communicated to the Remote Data Analysis Algorithm 102.

This model includes an initial estimate of equipment capacity (which may be defined in percentage terms or number of operational hours remaining before maintenance is required). This is information pulled from outside sources (the database) or, if no information is available, a rough guess is made such as "a lightly used asset has an initial capacity of 90%" or "a heavily used asset has an initial capacity of 75%" These assumptions may be improved through pattern recognition over time, as well as the expected sensitivity of the equipment to those conditions observed by the asset-monitoring network (e.g., temperature, humidity, vibration, usage). These sensitivity coefficients are ascertained from past observations, for example from external databases 1002 and from data that the user has input at the user interface 1006. As the system observes patterns and updates its assumptions, future models become stronger as they start off with better information. This modeling needs to be dynamic, as different types of equipment have different tolerances to environmental and operational conditions, and their internal components wear at different rates. The ability to form a unique degradation model for each type and piece of equipment is integral to the system and its ability to incorporate a wide variety of assets.

The central component of the degradation model is the mathematical expression of instantaneous degradation, which is a measure of asset capacity lost at each moment in time. Instantaneous degradation is expressed as a summation of some number of degradation constituents, with each constituent representing a unique contributing factor to asset degradation. There are two classes of constituent: progressive-based and shock-based. Progressive-based constituents represent processes or conditions that cause incremental, continuous degradation over time such as humidity, asset use, low-level vibrations, and even the passage of time itself. Each progressive-based constituent has an underlying statistical distribution (reflecting the stochastic nature of these degradation processes) which is then multiplied by the magnitude of the observed condition and a coefficient representing the asset sensitivity to this condition. For example, if an asset has a humidity sensitivity such that asset capacity is reduced by 0.005% for every 10% increase in relative humidity, then such an asset stored in a room with 60% relative humidity will have a degradation due to humidity equaling 0.03% per second. Each progressive-based degradation constituent shares this form.

Shock-based degradation constituents represent occasional, traumatic events that may occur randomly, have random severity (i.e. magnitude), or both. Examples of shock-based processes include temperature over/under a critical level, power surges, and drops. Each shock-based constituent has one or two underlying statistical distributions (depending on whether magnitude and/or time of occurrence are random) which is multiplied by a coefficient representing the asset sensitivity to this condition. For example, if an asset has its capacity reduced by 5% for every pound of force undergone when dropped, and when a drop randomly occurs a 12 pound impact is experienced, the asset degradation due to the drop will equal 60%. It should be noted that condition sensitivity is not always linear as described here for humidity and dropping, but the overall structure of the model remains the same, even with more complex relationships.

This model is then used by the degradation tracking sub-algorithm 1008 to interpret incoming data collected by the asset-monitoring network 1018 and therefore determine real-time equipment health (i.e., remaining capacity). The asset will also have a sensitivity to humidity, usage, the passage of time, and any other environmental/operational conditions tracked by the system. For example, if the model generated for a specific defibrillator stipulates that being dropped from waist height will reduce asset capacity by 20% and the tag module affixed to the defibrillator has registered two drops of this magnitude, for example through the accelerometer, then the degradation tracking sub-algorithm will deduce that the capacity of the defibrillator has been reduced by 40%. In practice, there are dozens of conditions being tracked simultaneously in real-time. Furthermore, condition sensitivity will frequently be non-linear (e.g., a temperature increase from 300 degrees F. to 370 degrees F. will do more damage to an asset than an increase from 20 degrees F. to 90 degrees F. even though these temperature changes have identical magnitude) and the degradation caused by one condition may be magnified by another condition. All of these complexities are captured in the model generated by the model generation sub-algorithm 1004 and their real impacts are tracked by the degradation tracking sub-algorithm 1008.

Whenever the estimate of current equipment health is updated, this information is used by the simulation sub-algorithm 1010 to forecast future degradation in a dynamic intertemporal forecasting heuristic. This sub-algorithm draws on a wide variety of metrics (e.g., present and historical rates of degradation, seasonal shifts in equipment usage, trends in the ambient environment) as it simulates thousands of possible degradation paths that may be taken. In so doing, the sub-algorithm determines which outcomes are unlikely (e.g., the infusion pump will undergo a catastrophic failure this week) and which are very likely (e.g., the infusion pump will require replacement parts in February due to increase usage during "flu season"). The intertemporal structure of this sub-algorithm ensures that each time new data is collected by the asset-monitoring network, the inferred health of the equipment health is recalculated, new simulations are performed, and the forecast is updated.

Degradation simulations are performed by using the intrinsic capability of a computer to mimic statistical distributions using random number generators. For each simulated time step, the algorithm considers each individual degradation constituent and generates a random value derived from the same statistical distribution associated with that constituent. Once all variables have been assigned a value, the expression for instantaneous degradation is solvable and a simulated degradation value is determined. This value is subtracted from the estimated current asset capacity, yielding the simulated asset capacity for the given time step. This process is repeated indefinitely until the simulated asset capacity reaches zero (or some user-defined minimum acceptable capacity). The time step at which this occurs is recorded, and then a new simulation is conducted. The algorithm performs thousands of these simulations, each time recording the time at which the simulated capacity reaches zero (i.e., the time at which the simulated asset needs maintenance). The forecast is the reported distribution of these simulated maintenance times, as well as key statistics such as the mean and standard deviation of this distribution.

The action sub-algorithm 1012 converts this degradation forecast into actionable information for the end-user. Based on a set of preferences defined by the user and the likely degradation path of the equipment, the sub-algorithm will make maintenance recommendations. The main rules being followed are: 1) if the degradation-tracking sub-algorithm 1008 finds that enough degradation has occurred such that asset capacity is now at zero (or beneath some user-defined minimum acceptable capacity), immediate maintenance is required; and 2) If the forecast generated by simulation algorithm 1010 is significantly altered by some condition, the algorithm must notify the user of that condition and include the appropriate pre-defined maintenance recommendation. Some examples are: (a) The defibrillator has been dropped 3 times. Check the defibrillator for damage. (b) The refrigerator is drawing 500 mA more current than usual. Fan cleaning or replacement is recommended. (c) The ultrasound machine has seen 2.3 times more use this week than last. Schedule inspection to be one week earlier than planned. (d) The vitals monitor has now been used for 5,000 hours. Perform standard maintenance procedure within the next 10 days. (e) High humidity detected around 3D printer. Perform corrosion check during next inspection. (f) Infusion pump has entered cleaning room 50 times. Check for chemical damage during next inspection.

This sub-algorithm may also access raw, real-time data collected by the asset-monitoring network 1018 in order to alert the user to conditions requiring immediate attention. These are pre-defined "If, then" relationships. For example, "If humidity is higher than X, do Y." The conditions are initially provided by the user or taken from an outside database. Such a condition could be ambient humidity above the tolerance specified by the manufacturer, the movement of an asset to a restricted location, overuse, or any other user-specified condition. Other examples include: (a) Centrifuge is vibrating at a lower frequency than usual. Emergency parts replacement is recommended. (b) High temperature detected around dialysis machine. Cooling fan replacement may be required. (c) Power surge detected by ventilator. Inspect for circuit damage. (d) Impact detected. Inspect for case for damage.

The final module in the data processing subsystem is the pattern recognition sub-algorithm 1016. This sub-algorithm uses statistical methods such as regression analysis to detect relationships between a host of variables including but not limited to: operational/environmental conditions, equipment location, maintenance frequency, alerts and types of alerts, equipment failures, class/make/model of equipment, equipment usage modes and levels, and time of day/month/year. By uncovering subtle patterns that affect equipment performance, this module is able to perform a process known as Bayesian updating, whereby it uses results of its analysis and the information gained in the process to update the parameters of other sub-modules.

A typical Bayesian update would have the following steps: First, the pattern recognition sub-algorithm 1016 performs a regression analysis to ascertain degradation relationships, uncovering those relationships that were previously unknown and using fresh data to arrive at better estimates of the relationships which has been included in the model. Second, the pattern recognition sub-algorithm 1016 replaces the model from model generation sub-algorithm 1004 with a newer version containing these updated degradation constituents, sensitivity coefficients, and updated statistical distributions. These steps repeats as the sub-algorithm 1016 receives additional data.

The continuous dynamic active learning due to the Bayesian updated process allows the system to be corrective, adapting the assumptions (e.g., the statistical distribution of component malfunctions, the rate of degradation under typical ambient conditions) inherent to its models and forecast. This means that the longer the system is used, the more accurate the model generation, simulation, and action sub-algorithms 1004, 1010, 1012 will become. It also means that the system can adapt to a wide variety of equipment, facilities, and user needs. Beyond leveraging these patterns for internal improvement, this sub-algorithm also reports its findings to the user, empowering them to adapt their own behavior and procedures accordingly.

In other implementations, the system may be built directly into and integral with the asset 300. So instead of installing plug and tag modules through a facility, the equipment itself is able to monitor all of these conditions and can interface wirelessly with the data analysis algorithm. For example, a hospital may at some point in the future order a GE vitals monitor, a Philips infusion pump, and a Siemens portable X-ray machine, and all of these different devices will be on the asset-monitoring network installed in the hospital. In this scenario, it is possible that these manufacturers purchase the hardware to install in their equipment (as in the case of Intel processors), or it is possible that this system is instead expressed as a set of standards for the manufacturers to follow (as in the case of Bluetooth).

The system and method of the present invention is implemented by computer software that permits the accessing of data from an electronic information source. The software and the information in accordance with the invention may be within a single, free-standing computer or it may be in a central computer networked to a group of other computers or other electronic devices. The information may be stored on a computer hard drive, on a CD ROM disk or on any other appropriate data storage device.

The system and method of the present invention include operation by one or more processing devices, including the computer 101, plug microcontroller 602, and tag microcontroller 806. It is noted that the processing device can be any suitable device, such as a computer, server, mainframe, processor, microprocessor, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, etc.), some of which are discussed above and shown in FIGS. 6, 8. The information may be stored on a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

A typical exemplary operation of the system follows. Sensor readings are made by each asset-monitoring module 408 and then transmitted via antennas 614, 814 to the data server 114a using low-frequency (e.g. 915 MHz) radio communication. If the asset-monitoring module 408 is out of communication range of the data server 114a, beacon modules 410 can serve as intermediaries, receiving this data from the asset-monitoring module 408 and transmitting identical data to the data server 114a if possible, or to another beacon module 410. This may repeat several times, with data transferring between several beacon modules 410 before finally reaching the data server 114a. Beacon modules 410 also communicate with asset-monitoring modules 408 via antennas 610, 812 using high-frequency (e.g. 2.4 GHz) radio waves so that any asset-monitoring module 408 may ascertain its location.

This location information, once determined, is also transmitted to the data server 114a over the low-frequency radio band. Each asset-monitoring module 408, asset 300, and beacon module 410 have a unique ID. When the asset-monitoring module 408 is deployed, its beacon ID becomes associated with the relevant asset ID, such as by using the RFID reader circuit 604 to receive the asset ID. If RFID chips are not used, then the user can manually associate the asset-monitoring module ID with asset 300. Only the beacon ID is associated with certain location (e.g., building/room/floor/hall). Information received by the data server 114a is stored on the data server 114a, then transmitted to the processing device 101 and the Remote Data Analysis Algorithm 102, such as through an internet connection. In this way, the data server 114a serves as the device on which the action sub-algorithm 1012 in the Data Processing Algorithm 1000 (1000 itself being synonymous with 102) operates. Outputs from the Data Processing Algorithm 1000 are communicated to the user via the user interface 1006 or, for example, outputs 104, 106 are transmitted to users 108, 110 over an internet connection for example, and displayed using the user interface 200 (FIG. 2).

At the user interface 200 (FIG. 2), the user selects an asset using the dropdown menu 202, and then the user interface is populated with real-time data relevant to that device such as location 204, on/off status 206, and utilization 208. An image of the device 210 is displayed, helping the user make sure they have selected the correct device or reminding them of what the device looks like should they need to find it within the facility. There is also a real-time feed of device alerts 212 which notifies the user of data updates and actions recommended by the system. This user interface 200 is the chief method by which the user is able to interact with the system, and it both communicates system outputs to the user as well as relays user inputs to the system. This means that, while not pictured in FIG. 2, the user interface 200 is the means by which the user inputs equipment information, maintenance preferences, maintenance records (see the user input via the interface 1006 in FIG. 10). The user interface 200 thus acts as the interface between the user and the rest of the algorithm. The user is able to issue commands to the system using the user interface. An example of this in FIG. 2 is the "LOCATE" button. If the user presses this button, a command is sent from the data server 114a using the low-frequency band to the relevant beacon module 408, compelling the beacon module 408 to locate the particular asset.

An exemplary implementation of the system follows. In this scenario, a portable X-ray machine is outfitted with a plug module 502 and tag module 700. Most of the time it sits in a hallway powered down, but a few times a day it is used to scan patients. When this happens, the plug module 502 senses that electrical current is being drawn by the machine and it sends a wireless signal that the X-ray machine is in use. This signal is relayed through a handful of beacon modules 410 before reaching the data server 114a where this information is stored and then forwarded to the remote data analysis algorithm over an internet connection. When the X-ray machine is no longer in use, the plug module 502 signals that the machine is now off and was in use for 1 hour. This information is also stored in the data server and forwarded to the remote data analysis algorithm. This continues for months with the remote data analysis algorithm 102 tracking the aggregate amount of time the X-ray machine has been in use (i.e. total utilization). At any time, hospital engineering staff may check the on/off status of the X-ray machine, as well as its total utilization using the user interface which is accessible by a networked device such as a tablet or computer. Eventually, total utilization reaches 300 hours—a utilization threshold set by the engineering manager or gleaned from a database—and the data analysis algorithm 102 notifies engineering staff (through the user interface 200) that routine maintenance is required by sending an alert to the user interface.

An engineer goes to perform this maintenance but cannot find the X-ray machine in the hallway where it is normally located. They access the user interface on their smartphone and press the "LOCATE" button which, over an internet connection, sends a prompt to the data server which is then wirelessly forwarded to the plug 502 and/or tag modules 700 on the X-ray machine. This prompt compels either module to wirelessly poll nearby beacon modules. Each beacon module 410 close enough to receive this polling signal responds with a unique ID and the plug and/or tag module recognizes which response had the greatest signal strength and wirelessly reports the associated ID to the data server 114a. Knowing which beacons are associated with which rooms, the data server converts this reported ID to a room number (which happens to be the ER in this example) and then communicates this over an internet connection to the user via the user interface 200. The engineer now can see that the equipment is in the ER and goes there to perform routine maintenance. Two days later, a stretcher is accidentally slammed into the X-ray machine during an emergency. The tag module 700 detects the impact and immediately alerts the engineering staff that an inspection is required. An engineer responds to this alert and finds that the machine case and some internal components are damaged. He is able to take the X-ray machine out of use so that it can be repaired, avoiding a potential malfunction during use on a patient.

As should be clear from the scenario discussed above, the system disclosed herein offers a number of benefits. For example, by abandoning inefficient periodic maintenance paradigms in favor of the dynamic, condition-based maintenance recommendations made by the system, clinical engineers can reduce time, effort, and money spent on maintenance tasks without jeopardizing safety or asset quality. In addition, patient safety will be improved due to the close monitoring of the behavior and environment of assets which enables hospital staff to catch failures before they occur. The disclosed system also provides knowledge of the specific conditions that have led to asset degradation informs engineers as to what specialized maintenance steps should be taken and which can be skipped, reducing engineer effort and asset downtime. Moreover, the system provides real-time location tracking will save staff countless hours searching for equipment.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A system for monitoring an asset, comprising:
   one or more asset-monitoring modules for monitoring the asset and providing monitored data; and
   a processing device receiving the monitored data and running a data analysis algorithm, wherein said data analysis algorithm predicts maintenance requirements for the asset;
   wherein the system is asset-agnostic, supporting multiple types and brands of assets and such that the performance of the assets can be managed and monitored in real-time.

2. The system of claim 1, wherein the data analysis algorithm comprises a statistical model of performance for one or more assets to be monitored.

3. The system of claim 1, wherein the data analysis algorithm comprises a degradation model for the asset that predicts maintenance requirements or off-line statuses for said asset.

4. The system of claim 1, wherein the data analysis algorithm applies Bayesian updating to perform real-time corrections in the performance model and degradation model.

5. The system of claim 1, wherein said one or more asset-monitoring modules comprise at least one of a tag module or a plug module.

6. The system of claim 1, wherein said one or more asset-monitoring modules are comprised of one or more sensors that monitor at least one of environmental conditions, operational conditions, or usage information related to the one or more assets.

7. The system of claim 1, further comprising one or more beacon modules broadcasting location signals to said one or more asset-monitoring modules, wherein said one or more asset-monitoring modules determine a location based on received location signals.

8. The system of claim 1, further comprising an equipment management dashboard that shows at least one of user alerts or recommendations related to the one or more assets.

9. The system of claim 1, wherein said one or more asset monitoring modules operates wirelessly.

10. The system of claim 1, wherein said one or more asset-monitoring modules are discrete devices separate from the asset and directly coupled with the asset to monitor the asset and provide the monitored data.

11. A method for monitoring an asset, comprising the steps of:
    monitoring, at one or more asset-monitoring modules, the asset;
    providing monitored data to a processing device;
    receiving the monitored data at the processing device; and
    predicting, using a data analysis algorithm, maintenance requirements for the asset;
    wherein the method is asset-agnostic, supporting multiple types and brands of assets and such that the performance of the one or more assets can be managed and monitored in real-time.

12. The method of claim 11, wherein the data analysis algorithm comprises a statistical model of performance for one or more assets to be monitored.

13. The method of claim 11, wherein the data analysis algorithm comprises a degradation model for the asset that predicts maintenance requirements or off-line statuses for said asset.

14. The method of claim 11, wherein the data analysis algorithm applies Bayesian updating to perform real-time corrections in the performance model and degradation model.

15. The method of claim 11, wherein one or more asset-monitoring modules comprise at least one of a tag module or a plug module.

16. The method of claim 11, wherein asset-monitoring modules are comprised of a plurality of sensors that monitor at least one of environmental conditions, operational conditions, or usage information related to the one or more assets.

17. The method of claim 11, further comprising one or more beacon modules broadcasting locator signals to said one or more asset-monitoring modules, wherein the beacon modules provide spatial location data on the asset.

18. The method of claim 11, further comprising an equipment management dashboard that shows at least one of user alerts or recommendations related to the one or more assets.

19. The method of claim 11, wherein the one or more asset monitoring modules operates wirelessly.

20. The method of claim 11, wherein the one or more asset-monitoring modules are discrete devices separate from the asset and directly coupled with the asset.

21. A system for monitoring one or more assets, comprising:
    one or more discrete asset-monitoring modules separate from the one or more assets and directly coupled with the one or more assets for monitoring the one or more assets and providing monitored data; and
    a processing device receiving the monitored data and comparing the monitored data against previously recorded data to determine an amount of usage of the asset.

22. The system of claim 21, wherein the usage includes at least one of hours in use or modes of operation, the modes of operation including at least one of on, off, high, medium, low, heating, or cooling.

23. The system of claim 21, wherein the asset receives power from a power supply, and wherein said one or more asset-monitoring modules comprise a plug positioned between the power supply and the asset to transfer power from the power supply to the asset and monitor the transferred power.

24. The system of claim 21, wherein said one or more asset-monitoring modules each comprise a sensor.

25. The system of claim 24, said sensor comprising at least one of a current sensor, a voltage sensor, a thermometer, an accelerometer, a gyroscope, a hygrometer, or an altimeter.

26. The system of claim 21, wherein the monitored data comprises at least one of current, voltage, temperature, acceleration, orientation, humidity, or pressure.

27. The system of claim 21, wherein the one or more asset-monitoring modules are asset-agnostic, supporting multiple types and brands of assets and such that the performance of the one or more assets can be managed and monitored in real-time.

* * * * *